United States Patent [19]

Noguchi et al.

[11] 4,143,627
[45] Mar. 13, 1979

[54] INTERNAL COMBUSTION ENGINE

[75] Inventors: Masaaki Noguchi, Nagoya; Masaharu Sumiyoshi, Toyota; Yukiyasu Tanaka, Okazaki; Taro Tanaka, Chiryu, all of Japan

[73] Assignee: Nippon Soken, Inc., Nishio, Japan

[21] Appl. No.: 784,370

[22] Filed: Apr. 4, 1977

[30] Foreign Application Priority Data

Apr. 6, 1976 [JP] Japan .................. 51-38448
Apr. 14, 1976 [JP] Japan .................. 51-42698
Apr. 29, 1976 [JP] Japan .................. 51-48909

[51] Int. Cl.$^2$ ............................................ F02M 23/00
[52] U.S. Cl. ............................. 123/75 B; 123/191 S
[58] Field of Search ......... 123/75 B, 32 SP, 191 SP, 123/191 S

[56] References Cited

U.S. PATENT DOCUMENTS

| 3,968,782 | 7/1976 | Noguchi | 123/191 SP |
| 4,000,731 | 1/1977 | Noguchi | 123/191 SP |
| 4,048,973 | 9/1977 | Sanda | 123/191 SP |
| 4,064,860 | 12/1977 | Kato | 123/191 SP |
| 4,072,136 | 2/1978 | Noguchi | 123/75 B |

Primary Examiner—Ronald H. Lazarus
Attorney, Agent, or Firm—Cushman, Darby & Cushman

[57] ABSTRACT

An internal combustion engine having a main combustion chamber connected to an intake port for an air-fuel mixture, and an auxiliary combustion or a precombustion chamber communicated with the main combustion chamber through a plurality of torch apertures. The auxiliary combustion chamber is, before a combustion stroke of the engine, supplied through the torch apertures with an amount of the mixture for pre-combustion therein. A spark plug has a set of electrodes disposed in at least one of the torch apertures for causing the pre-combustion of the mixture in the auxiliary combustion chamber to thereby generate torch jets which are directed into the main combustion chamber to ignite the mixture therein. The torch apertures are arranged such that the residual combustion gases produced during a combustion stroke of the engine and retained in the auxiliary combustion chamber are forced out therefrom through at least one of the torch apertures during a succeeding intake stroke, due to the mixture flowing into the auxiliary combustion chamber through the other torch aperture or apertures.

18 Claims, 16 Drawing Figures

INTERNAL COMBUSTION ENGINE

BACKGROUND OF THE INVENTION

The present invention relates to an internal combustion engine, and more particularly to a torch-ignition type internal combustion engine having a main combustion chamber connected to an intake port for an air-fuel mixture and an auxiliary combustion chamber for the torch-ignition of a charge of the mixture fed into the main combustion chamber.

Torch-ignition internal combustion engines of the type referred to above have been known in the art. This type of internal combustion engines have an advantage such that the production of harmful components during the combustion of an air-fuel mixture can be minimized. In order to effectively produce the latter advantageous effect, the internal combustion engines of the type concerned have heretofore been provided with various arrangements and constructions. The torch-ignition internal combustion engines having any of these arrangements and constructions have a common and general characteristic that the engine performance was greatly influenced by the shape of the auxiliary combustion chamber, the size and orientation of a torch aperture and a position of spark plug electrodes. The engine performance which was most influenced by the latter factors was the ignitability and torch effect.

In the prior art torch-ignition type internal combustion engines, it was usual to provide a single torch aperture at that end of the auxiliary combustion chamber adjacent to the main combustion chamber, and to dispose the spark plug electrodes at the inner part of the auxiliary combustion chamber remote from the torch aperture. Any thoughtful consideration was not made with respect to the positional relationship between the torch aperture and the spark plug electrodes.

It is the inventors' understanding that, with the positioning of the spark plug electrodes employed in the prior art, the residual gases produced during a combustion stroke and retained in the auxiliary combustion chamber were forced into the inner part of the auxiliary combustion chamber by an air-fuel mixture introduced through the torch aperture into the auxiliary combustion chamber by the upward movement of the piston on a compression stroke; thus, at the time of ignition, the residual gases were retained in the inner part of the auxiliary combustion chamber forming a stratum in the vicinity of the spark plug electrodes, which presumably adversely affected the spark-ignition of the mixture in the auxiliary combustion chamber. It was observed by the inventors that the ignitability was injured particularly during a low-load engine operation with a resultant poor engine drivability.

Further, with the positioning of the spark plug electrodes of the prior art, the front face of the combustion flame produced by the spark-ignition in the auxiliary combustion chamber proceeded from the inner part thereof toward the torch aperture on the combustion stroke. Thus, an amount of the air-fuel mixture existed in an unburnt state between the inner part of the auxiliary combustion chamber and the torch aperture was forced out of the auxiliary combustion chamber through the torch aperture before the combustion flame face reached the torch aperture, with a result that the torch effect produced was very weak or reduced.

SUMMARY OF THE INVENTION

It is an object of the present invention to provide an internal combustion engine which eliminates the above-discussed difficulties of the prior art engines, and improves the ignitability and torch effect, thereby reliably reducing the emission of harmful exhaust gas components.

It is another object of the invention to provide an internal combustion engine which ensures the improved ignitability and torch effect under all operational conditions of the engine including a high load or a high speed operation and a low load or a low speed operation.

It is a further object of the invention to provide an internal combustion engine which improves an efficiency of an air-fuel mixture flowing into the auxiliary combustion chamber, thereby achieving the improved ignitability and torch effect.

The present invention provides an improvement in an internal combustion engine of the type which comprises a cylinder, a piston slidably disposed within the cylinder, a cylinder head, a main combustion chamber defined between the cylinder head and the top surface of the piston, an intake port through which an air-fuel mixture can flow into the main combustion chamber, an intake valve adjusting the mixture flow through the intake port, an auxiliary combustion chamber confined in the cylinder head and communicated with the main combustion chamber, the auxiliary combustion chamber being adapted to be supplied before a combustion stroke of the engine with an amount of the air-fuel mixture for pre-combustion therein, and also adapted to be scavenged during an intake stroke of a succeeding cycle of the engine operation, and means including a spark plug for causing the pre-combustion of the mixture in the auxiliary combustion chamber to thereby cause torch-ignition of the mixture in the main combustion chamber.

According to one of the improved features of the invention, there are provided a plurality of torch apertures communicating the main combustion chamber and the auxiliary combustion chamber, and the spark plug has its electrodes disposed in at least one of the torch apertures. By this feature of the invention, a part of the mixture fed into the main combustion chamber during the intake stroke is forced through the torch apertures into the auxiliary combustion chamber on a succeeding compression stroke to urge residual gases if any toward the inner part of the auxiliary combustion chamber remote from the main combustion chamber, whereby the spark plug electrodes are substantially free from the residual gases and surrounded by the fresh mixture. This greatly improves the spark-ignitability of the mixture. The spark-ignition produces a fire or combustion flame which propagates on one hand within the main chamber and on the other hand runs into the auxiliary combustion chamber toward the inner part thereof to cause a combustion of the mixture therein. The combustion flame thus propagated in the auxiliary combustion chamber spurts therefrom through all of the torch apertures into the main combustion chamber forming strong torch jets for the torch-ignition of the mixture therein. The abovementioned positioning of the spark plug electrodes according to the invention decreases the amount of an unburnt mixture forced out of the auxiliary combustion chamber through the torch apertures into the main combustion chamber and prolongs the duration of the torch jets with a result that the torch effect is greatly improved.

According to another improved feature of the invention, there are provided a first spark plug having its electrodes disposed in at least one of the torch apertures, and a second spark plug having its electrodes disposed at the inner part of the auxiliary combustion chamber remote from the torch apertures. With this feature, satisfactory engine performance in terms of the ignitability and torch effect can be obtained under all operational conditions of the engine including a high load or a high speed operation and a low load or a low speed operation.

Preferably, the respective torch apertures are arranged such that the residual gases produced during the combustion stroke and retained in the auxiliary combustion chamber can be effectively forced out therefrom through at least one of the torch apertures during a succeeding intake stroke, due to the mixture flowing into the auxiliary combustion chamber through the other torch aperture or apertures.

The above and other objects, features and advantages of the present invention will become more apparent by the following description with reference to the accompanying drawings.

BRIEF DESCRIPTION OF THE DRAWINGS

Throughout these figures, similar parts are designated by similar reference numerals.

DESCRIPTION OF THE PREFERRED EMBODIMENTS

Figure 1:
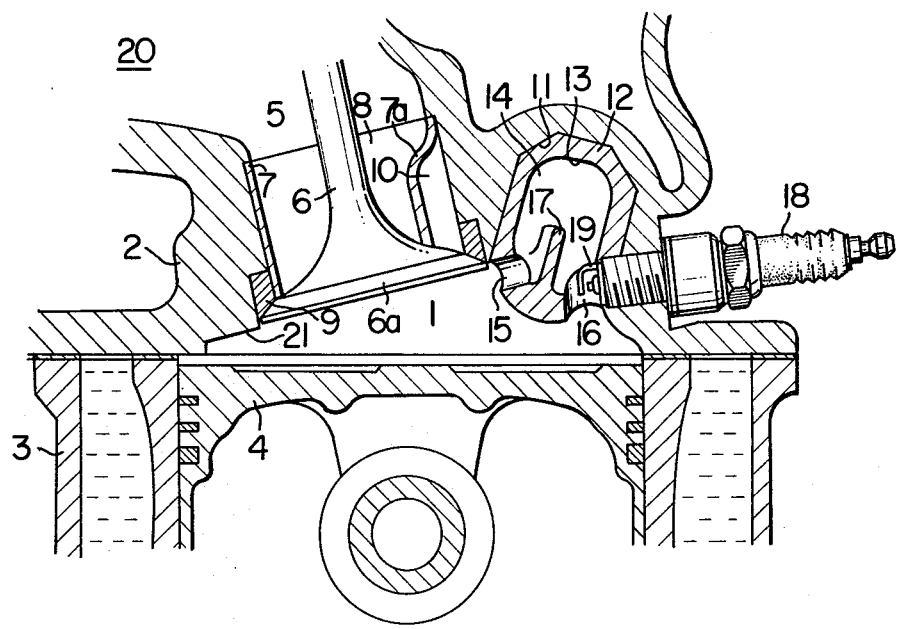
FIG. 1 is a fragmentary sectional side elevation of a first embodiment of an internal combustion engine according to the present invention.

Referring first to FIG. 1, an internal combustion engine in accordance with a first embodiment of the present invention is generally designated by a reference numeral 20. The engine 20 includes a cylinder 3 and a piston 4 slidably disposed within the cylinder 3. A cylinder head 2 is secured to the top of the cylinder 3 and has a bottom or an inner face in which is formed a recess 21 which cooperates with the top surface of the piston 4 to define a main combustion chamber 1. The cylinder head 2 defines therein an intake port 5 having a downstream end connected to the main combustion chamber 1. An intake valve 6 having a valve head 6a is reciprocally mounted on the cylinder head 2 to cooperate with a valve seat 9 to control in well-known manner an air-fuel mixture flowing through the intake port 5 into the main combustion chamber 1. A generally cylindrical insert 7 is fitted into the downstream end of the intake port 5 and inwardly deformed at 7a to provide a recess in the outer peripheral surface of the insert 7. The deformed part 7a of the insert 7 acts as a partition which divides the downstream end portion of the intake port 5 into main and auxiliary passages 8 and 10 for lean and rich air-fuel mixture produced by main and auxiliary carburetors (not shown), respectively. The flows of the mixtures through the main and auxiliary intake passages 8 and 10 into the main combustion chamber 1 are both simultaneously controlled solely by the intake valve 6.

The cylinder head 2 is formed with a hole or a bore 11 which is open in the surface of the recess 21 adjacent to the downstream end of the auxiliary intake passage 10. A hollow auxiliary chamber insert 12 is press-fitted into the hole 11. The insert 12 has a substantially smoothly continuous inner surface 13 which defines an auxiliary combustion chamber 14. The insert 12 has a hemispherical outer end which protrudes into the main combustion chamber 1 and in which a pair of torch apertures 15 and 16 are formed to communicate the auxiliary combustion chamber 14 with the main combustion chamber 1. A first torch aperture 15 is located adjacent to the downstream end of the auxiliary intake passage 10 and directed such that, when the intake valve 6 is moved to its fully open position, the torch aperture 15 is positioned on the side of the valve head 6a adjacent to the valve seat 9 so that a charge of an air-fuel mixture, which mainly consists of an amount of the rich air-fuel mixture from the auxiliary intake passage 10, is guided by the back face of the head 6a toward and through the torch aperture 15 into the auxiliary combustion chamber 14. For this reason, the first aperture 15 may be termed "suction aperture". The other or second torch aperture 16 is remote from the aperture 15 and has an axis extending in a direction different from that of an axis of the first aperture 15.

From the portion of the inner surface 13 of the insert 12 adjacent to the hemispherical outer end thereof and between the two apertures 15 and 16, a guide wall 17 extends substantially toward the center of the auxilairy combustion chamber 14 to divide the outer part of the auxiliary combustion chamber 14 which is adjacent to the outer hemispherical end of the insert 12 into two sections. The first torch aperture 15 is open to one of the sections, while the second torch aperture 16 is open to the other section. Thus, the two torch apertures 15 and 16 are communicated with each other through the inner part of the auxiliary combustion chamber 14 which is remote from the torch apertures 15 and 16.

A spark plug 18 is removably mounted on the cylinder head 2 and has a set of electrodes 19 disposed in the second torch aperture 16 so that the spark plug 18 may be electrically energized to ignite the mixture in the second aperture 16 about the end of a compression stroke.

Next, the operation of the internal combustion engine of the first embodiment will be described. When the intake valve 6 is moved to its open position on an intake stroke, the downward movement of the piston 4 is operative to supply into the main combustion chamber with a charge of an air-fuel mixture which chiefly consists of an amount of the lean air-fuel mixture from the intake port 5. At this time, the rich mixture from the auxiliary intake passage 10 is guided by the back face of the valve head 6a mainly toward the first torch aperture 15 through which the rich mixture flows into the auxiliary combustion chamber 14. The fresh rich mixture is guided in the auxiliary combustion chamber 14 by the guide wall 17 to the inner part of the auxiliary combustion chamber 14. At this part of the chamber 14, the mixture is guided and turned by the hemispherical, concave inner end portion of the inner surface 13 of the auxiliary combustion chamber 14 toward the second torch aperture 16. A part of the mixture flows out of the auxiliary combustion chamber 14 into the main combustion chamber 1, through the second torch aperture 16. The flow of the fresh rich mixture through the auxiliary combustion chamber 14 reliably sweeps away and discharges from the auxiliary chamber 14 the residual gases retained therein. Thus, the auxiliary combustion chamber 14 are efficiently scavenged.

On a succeeding compression stroke, the lean mixture in the main combustion chamber 1 is compressed by the upward movement of the piston 4. A part of the compressed lean mixture is forced through the first and second torch apertures 15 and 16 into the auxiliary combustion chamber 14 and urges the rich mixture, and residual combustion gases if any, toward the inner end of the auxiliary chamber 14. Further, the lean mixture part is mixed with the rich mixture and the residual gases in the auxiliary chamber 14. As a result, a fresh mixture exists at locations in and near the torch apertures 15 and 16. At least it is avoided that a large amount of the residual gases exists around the spark plug electrodes 19 about the end of the compresstion stroke.

About the end of the compression stroke, the spark plug 18 is electrically energized to produce a spark discharge for the ignition of the air-fuel mixture. The spark plug 18 initially ignites the mixture part which is present in the second torch aperture 16, the spark plug electrodes 19 being disposed therein. Because the mixture present in the second torch aperture 16 is a fresh mixture as discussed above, the mixture part can reliably be ignited by the spark plug 18. The ignition produces a combustion flame or fire which propagates and spreads toward the main combustion chamber 1 and the auxiliary combustion chamber 14. It will be appreciated that, because the auxiliary combustion chamber 14 is filled mainly with the rich mixture, the fire propagates at a higher velocity in the auxiliary chamber 14 than in the main chamber 1 with a resultant abrupt pressure build-up in the auxiliary chamber 14. Thus, the fire in the auxiliary combustion chamber 14 runs through both torch apertures 15 and 16 into the main combustion chamber 1 forming torch jets. The guide wall 17 functions to guide the initial fire toward the inner end of the auxiliary combustion chamber 14, so that the fire grows toward the inner end of the auxiliary combustion chamber 14 while the energy of the fire is progressively increased with a resultant production of strong torch jets. The torch jets continue to run for a long period of time.

The production of the torch jets expels only a small amount of unburnt air-fuel mixture from the auxiliary chamber 14 into the main chamber 1. These facts in combination with the fact that the auxiliary combustion chamber 14 is filled with a readily combustible mixture contribute to the production of strong torch jets. The lean mixture in the main combustion chamber 1 is thus reliably ignited by the strong jets and is burnt at a high burning velocity.

The improvements in the ignitability and in the torch effect as discussed above assure an improved purification of the engine exhaust gases without any reduction or decrease in the efficiency of combustion to thereby ensure a good engine performance.

Figure 2:
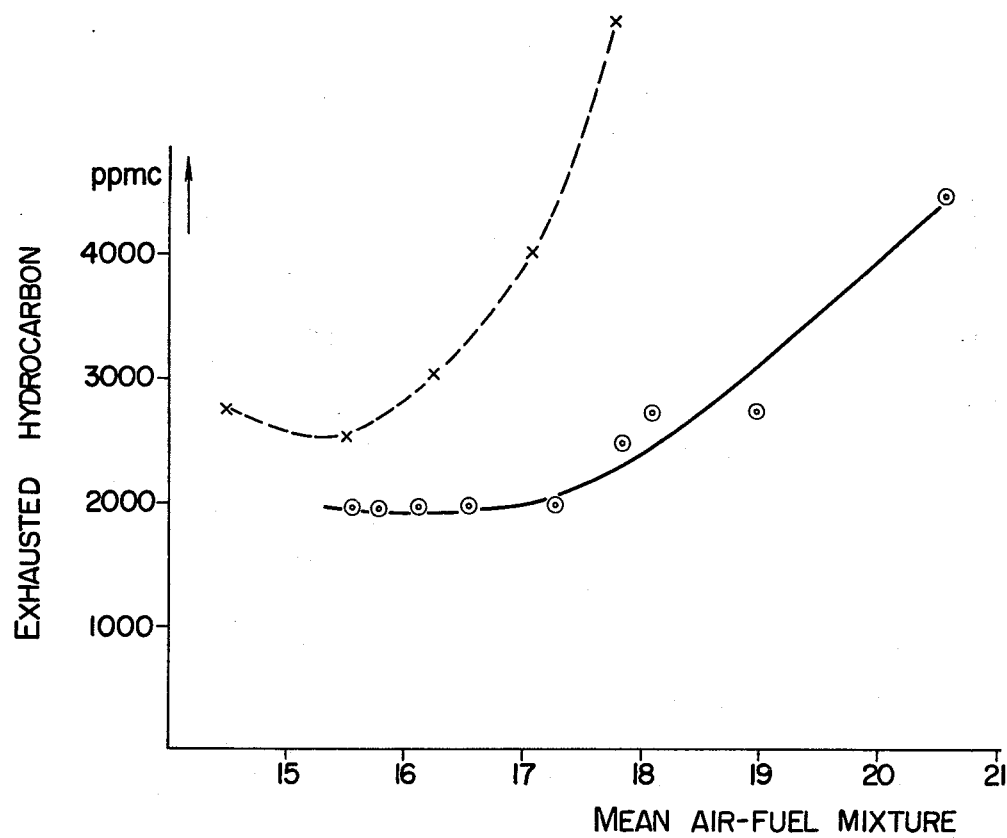
FIG. 2 graphically shows the performance of the engine of FIG. 1 in comparison with that of the prior art engine.

FIG. 2 illustrates graphically the performance of the engine of FIG. 1, in comparison with the performance of a prior art engine in which spark plug electrodes are disposed at the inner part of an auxiliary combustion chamber remote from a main combustion chamber. The FIG. 2 graph was obtained on the basis of the inventors' experiments. The experimental results were obtained under idling operations of the engines and the engine speeds of 900 r.p.m. Further, the ignitions were effected at 0° before the top dead centers. In the FIG. 2 graph, an obscissa indicates mean air-fuel ratio, i.e., averaged air-fuel ratio value of the mixtures in the main combustion chamber and the auxiliary combustion chamber, while an ordinate indicates an amount of hydrocarbon exhausted from each engine. A solid line of FIG. 2 shows the performance of the engine of FIG. 1, while a dotted line shows the performance of the prior art engine. As will be understood from FIG. 2, the prior art engine exhausted hydrocarbon in larger amount, and the amount of hydrocarbon exhausted therefrom was largely increased when the mean air-fuel ratio was higher than 16. In contrast, the engine of FIG. 1 exhausted a smaller amount of hydrocarbon. It should particularly be noted that the engine of FIG. 1 exhausted relatively small amount of hydrocarbon even when the mean air-fuel ratio was high. These experimental resutls show that the engine of FIG. 1 can achieve improved ignitability as well as improved torch effect.

Figure 3:
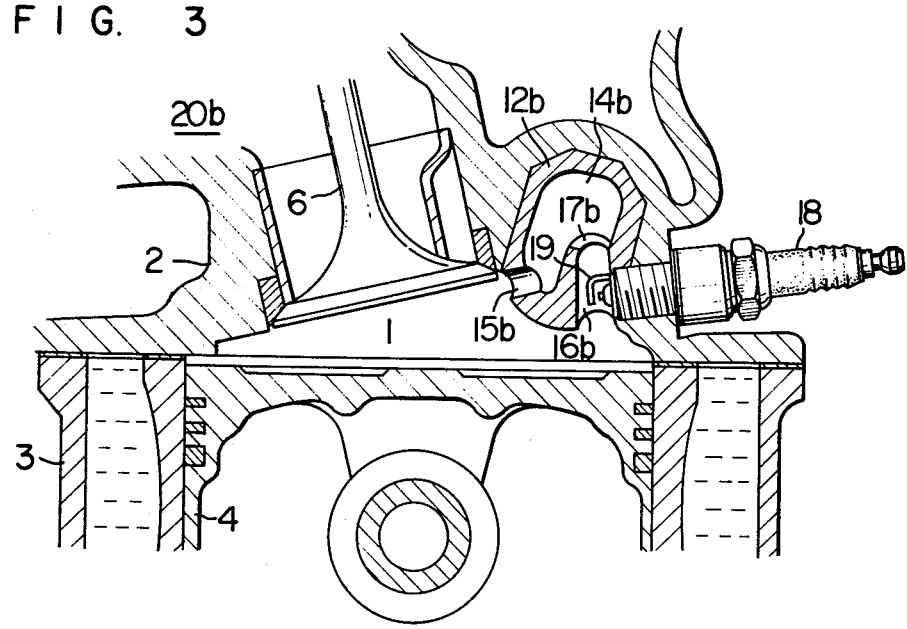
FIG. 3 is a fragmentary sectional side elevation similar to FIG. 1 illustrating a second embodiment of the invention.

FIG. 3 illustrates an internal combustion engine of a second embodiment of the invention generally designated by reference numeral 20b. The second embodiment is different from the first embodiment in that the second embodiment is provided with a modified auxiliary chamber insert 12b. The insert 12b defines therein an auxiliary combustion chamber 14b and formed with a first and a second torch apertures 15b and 16b, as in the first embodiment. The difference is that, instead of a flat guide wall as used in the first embodiment, the modified auxiliary chamber insert 12b has a bank 17b having a generally semi-circular or arcuate cross-section and extending a distance into the auxiliary chamber 14b along the inner peripheral side wall of the auxiliary chamber 14b adjacent to the second torch aperture 16b. The arcuate bank 17b and an adjacent wall portion of the insert 12b cooperate to surround or define the second torch aperture 16b.

The second embodiment is provided with a single spark plug 18 having a set of electrodes 19 disposed in the second torch aperture 16b, as in the first embodiment shown in FIG. 1. The second embodiment is operative in a manner similar to that of the first embodiment. The bank 17b functions to facilitate propagation of the initial fire or combustion flame produced in the second torch aperture 16b toward the inner end portion of the auxiliary combustion chamber 14b for the improved torch effect.

Figure 4:
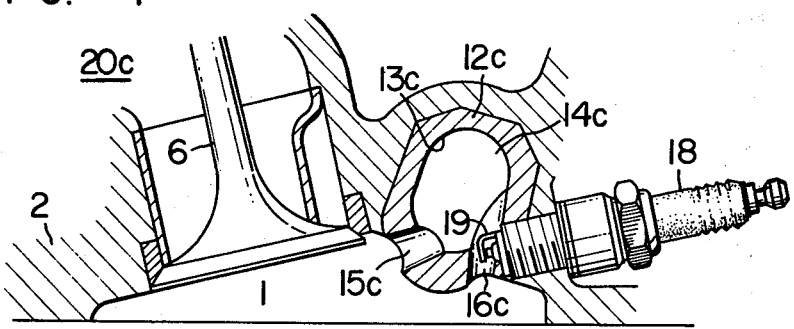
FIG. 4 is a fragmentary sectional side view of a cylinder head, showing an essential part of an internal combustion engine according to a third embodiment of the invention.

FIG. 4 illustrates an internal combustion engine of a third embodiment of the invention generally designated by reference numeral 20c. This embodiment is provided with a further modified auxiliary chamber insert 12c having an inner peripheral surface 13c which defines an auxiliary combustion chamber 14c and which is smoothly continuous over substantially all the surface areas thereof. No guide wall extends into the auxiliary chamber 14c and, instead, first and second torch apertures 15c and 16c extend through the wall of the insert 12c substantially tangential to the inner peripheral surface 13c. A set of electrodes 19 of a single spark plug 18 is disposed in the second torch aperture 16c, as in the preceding embodiments.

With the arrangement of the third embodiment, a charge of fresh air-fuel mixture flows through the first torch aperture 15c into the auxiliary combustion chamber 14c substantially tangential to the inner peripheral surface 13c of the insert 12c during a suction or intake stroke. The flow of the mixture in the auxiliary chamber 14c is guided by the smoothly continuous peripheral surface 13c to form a loop in the auxiliary chamber 14c. Thus, the mixture flows through and over substantially all points of the auxiliary chamber 14c and reaches the second torch aperture 16c to reliably scavenge the auxiliary chamber 14c. On a succeeding compression stroke, a part of the lean mixture in the main combustion chamber 1 is forced through both torch apertures 15c and 16c into the auxiliary combustion chamber 14c to produce a vortex flow therein which facilitates homogenization of mixtures and any residual combustion gases in the auxiliary combustion chamber for improved combustion and torch effect. It is to be particularly noted that propagation and growth of the initial combustion flame produced in the second torch aperture 16c toward the inner part of the auxiliary chamber 14c are greatly facilitated by the tangential orientation of the second torch aperture 16c relative to the inner peripheral surface 13c of the auxiliary chamber insert 12c.

Figure 5:
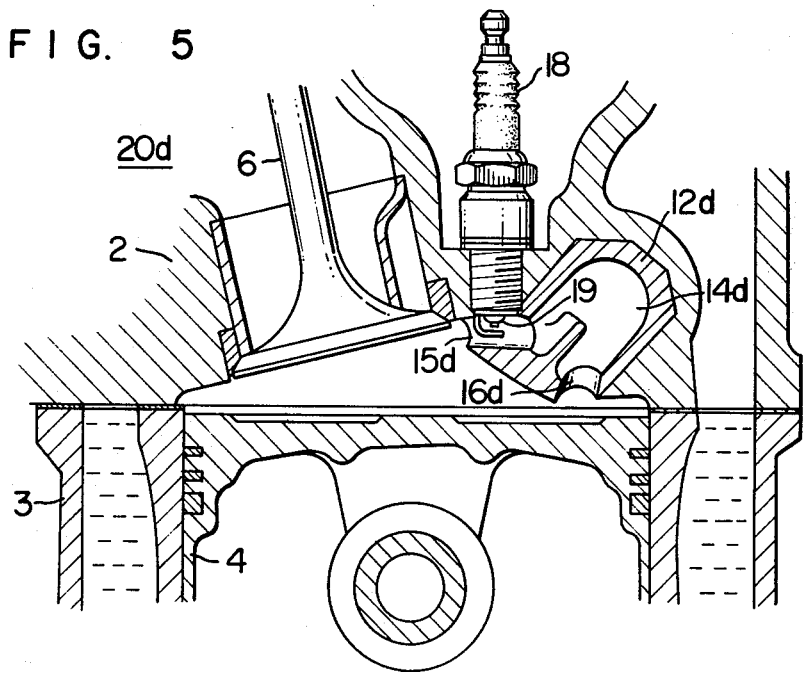
FIGS. 5 to 8 are sectional views similar to FIG. 1 illustrating a fourth, a fifth, a sixth and a seventh embodiments, respectively, of the invention.

FIG. 5 illustrates an internal combustion engine of a fourth embodiment of the invention generally designated by reference numeral 20d. The fourth embodiment 20d is substantially similar to the first embodiment described, except that the fourth embodiment is provided with a spark plug 18 having a set of electrodes 19 disposed in a first torch aperture 15d formed in an auxiliary chamber insert 12d. The fourth embodiment can produce substantially similar meritorious effects to those of the first embodiment in which the spark plug electrodes are disposed in the second torch aperture. In FIG. 5, reference numerals 14d and 16d designate an auxiliary combustion chamber and a second torch aperture, respectively.

Figure 6:
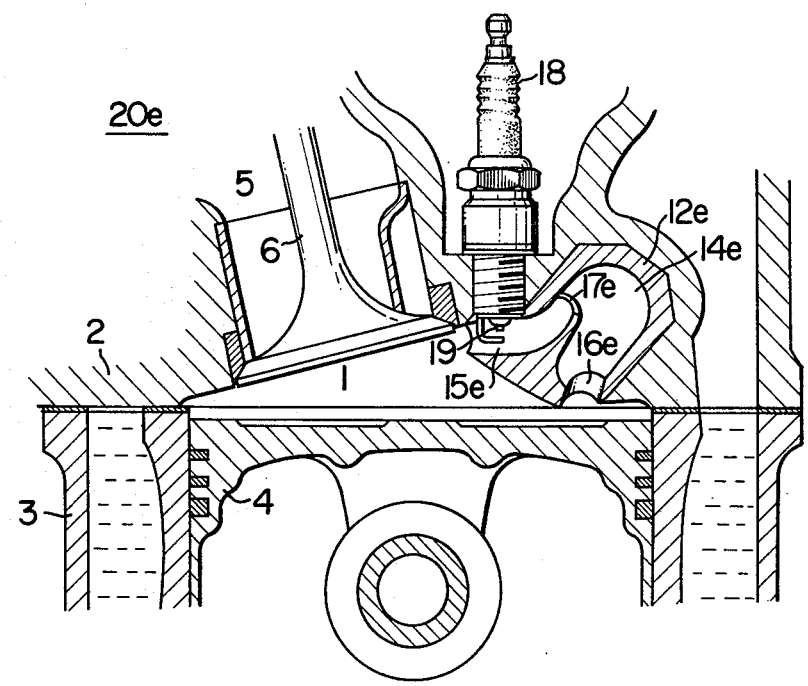

FIG. 6 illustrates an internal combsution engine of a fifth embodiment of the invention generally designated by reference numeral 20e. In the fifth embodiment, an auxiliary chamber insert 12e has a bank 17e having a generally semi-circular or arcuate cross-section and extending a distance into an auxiliary combustion chamber 14e along the inner peripheral side wall of the auxiliary combustion chamber 14e adjacent to a first torch aperture 15e. The first torch aperture 15e is curved along the latter peripheral side wall and open to the auxiliary combustion chamber 14e at its one end. A set of electrodes 19 of a spark plug 18 are disposed in the first torch aperture 15e. Reference numeral 16e designates a second torch aperture. The fifth embodiment can provide similar result to that of the second embodiment described with reference to FIG. 3.

Figure 7:
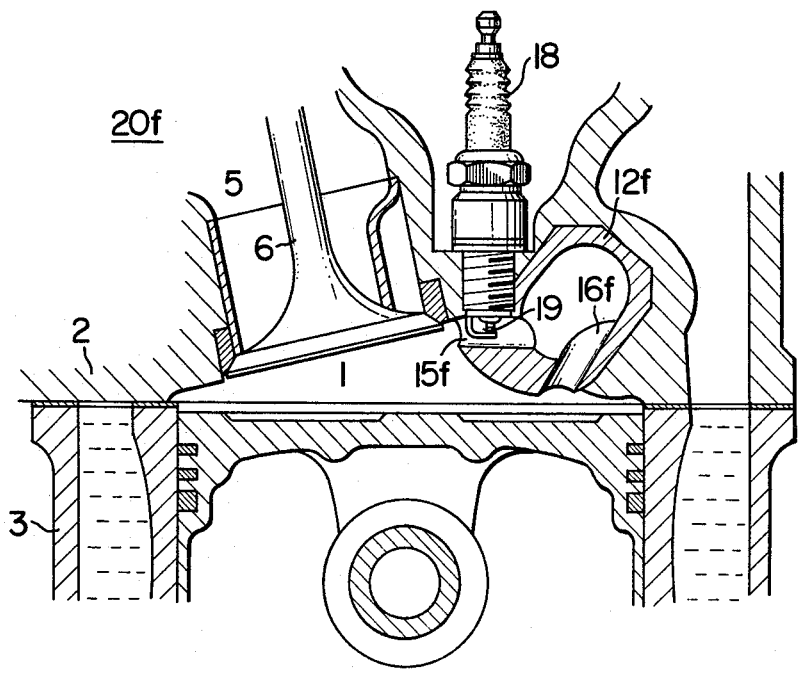

FIG. 7 illustrates an internal combustion engine of a sixth embodiment of the invention generally designated by reference numeral 20f. The sixth embodiment is substantially similar to the third embodiment shown in FIG. 4, except that a set of electrodes 19 of a spark plug 18 of the sixth embodiment are disposed in a first torch aperture 15f rather than the second torch aperture as in the third embodiment. In FIG. 7, reference numerals 12f and 16f designate an auxiliary chamber insert and a second torch aperture, respectively. The sixth embodiment can provide similar result to that of the third embodiment.

It is to be noted that, although the above-described embodiments relate to internal combustion engines of the type which supplies a rich air-fuel mixture into an auxiliary combustion chamber from a rich mixture passage of an intake port, the present invention is applicable to internal combustion engines of the type which disposes a fuel injection nozzle in an intake port.

Figure 8:
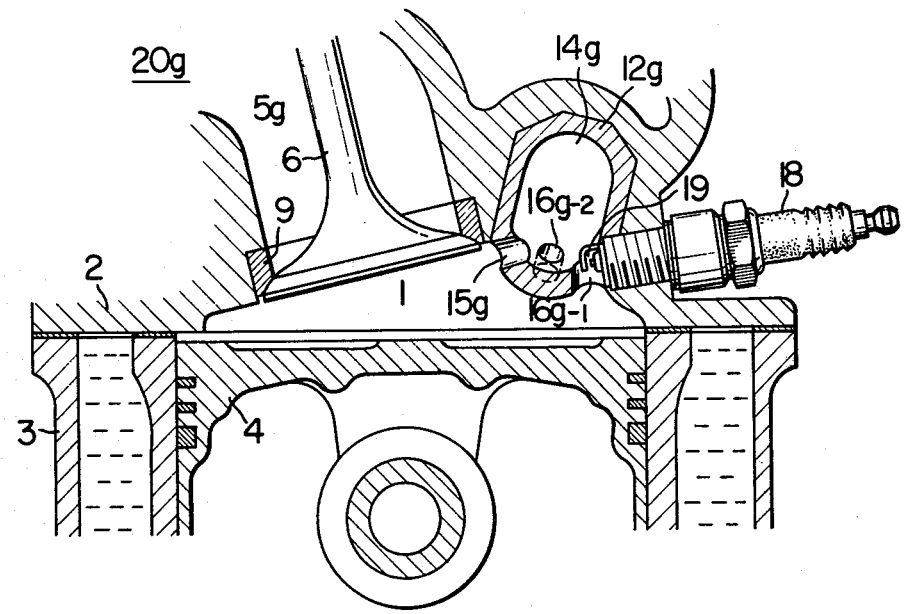

FIG. 8 illustrates an internal combustion engine of a seventh embodiment of the invention generally designated by reference numeral 20g, in which a homogeneous air-fuel mixture is supplied through a single intake port 5g into both main combustion chamber 1 and auxiliary combustion chamber 14g. The seventh embodiment is not provided with any rich mixture supply means such as a rich mixture passage. The auxiliary combustion chamber 14g is defined in an auxiliary chamber insert 12g having three torch apertures 15g, 16g-1 and 16g-2 having axes extending in different directions, respectively. The first torch aperture 15g is positioned relatively near to a valve seat 9 and directed toward the downstream end of the intake port 5g. A spark plug 18 is positioned such that the electrodes 19 thereof are disposed in the second torch aperture 16g-1. The spark plug 18, however, is not limited to the positioning shown in FIG. 8 but may be placed in the first torch aperture 15g or the third torch aperture 16g-2.

As will be apparent from the seventh embodiment, the present invention may also be applied to an internal combustion engine of the type that has an auxiliary combustion chamber which is not particularly intended to be supplied with a rich air-fuel mixture. In addition, the torch apertures are not limited in number to two or three and may be of any plural number.

Figure 9:
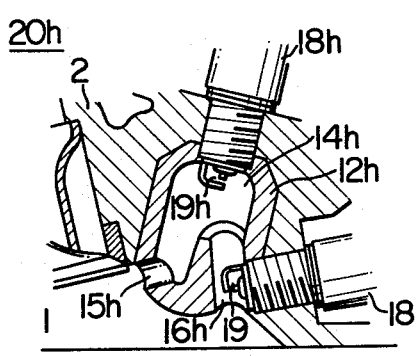
FIGS. 9 to 11 are sectional views illustrating essential parts of an eighth, a ninth and a tenth embodiments, respectively, of the invention, in each of which a first and a second spark plugs are provided.

FIG. 9 illustrates an internal combustion engine of an eighth embodiment of the invention generally designated by reference numeral 20h. The eighth embodiment is substantially similar to the second embodiment shown in FIG. 3, except that the eighth embodiment is provided with a second spark plug 18h in addition to a first spark plug 18. The first spark plug 18 has a set of electrodes 19 disposed in a second torch aperture 16h, as similar to the spark plug of the second embodiment. The second spark plug 18h is positioned such that the electrodes 19h thereof are disposed at the inner part of an auxiliary combustion chamber 14h remote from a main combustion chamber 1. Reference numerals 12h and 15h designate an auxiliary chamber insert and a first torch aperture, respectively.

With the construction of the eighth embodiment, the first and the second spark plugs 18 and 18h are electrically energized to produce spark discharges for the ignition of the air-fuel mixture about the end of a compression stroke. In the case where both of the spark plugs 18 and 18h are controlled to produce spark discharges simultaneously, the mixture parts present in the second torch aperture 16h and the inner part of the auxiliary combustion chamber 14h are initially ignited with the first and the second spark plugs 18 and 18h, respectively. Because of the provision of the two spark plug 18 and 18h, the ignition of the mixture is reliably effected under all operational conditions of the engine. In the case where the engine is under a low load or a low speed operation in which ignitability with the second spark plug 18h is relatively inferior because of a relatively large amount of residual gases forced into the inner part of the auxiliary combustion chamber 14h on the compressed stroke and retained therein, the first spark plug 18 having the electrodes surrounded by a fresh mixture reliably ignites the latter mixture. On the other hand, in the case where the engine is under a high load or a high speed operation, a spark discharged from the first spark plug 18 tends to be blown out due to an increased flow speed of the mixture introduced through the second torch aperture 16h into the auxiliary combustion chamber 24h. Under the latter engine operation, the auxiliary combustion chamber 14h is scavenged on an intake stroke very efficiently due to the larger amount of mixture flowing thereinto through the first torch aperture 15h, and the increased flow speed of the mixture introduced thereinto on the compression stroke produces a significant vortex flow therein to thereby promote homogenization of the mixtures and the residual gases in the auxiliary combustion chamber 14h. These facts in combustion with the fact that the flow speed of the mixture is decreased at the inner part of the auxiliary combustion chamber assures a reliable ignition with the second spark plug 18h under the high load or high speed operation. It will be understood that, when the engine is operated under conditions other than the conditions described above, both of the first and second spark plugs 18 and 18h reliably ignite the mixture. It is to be noted that the improved ignitability can be similarly achieved when the ignition time of the first spark plug 18 is a little different from that of the second spark plug 18h.

A combustion flame or fire produced by the ignition with the first spark plug 18 propagates and spreads toward the main combustion chamber 1 and the auxiliary combustion chamber 14h, while a combustion flame or fire produced by the ignition with the second spark plug 18h propagates and spreads in the auxiliary combustion chamber 14h from the inner part thereof toward the outer part adjacent to the main combustion chamber 1. Because the auxiliary combustion chamber 14h is filled mainly with the rich mixture, the fires propagate at a higher velocity in the auxiliary combustion chamber 14h than in the main combustion chamber 1 with a resultant abrupt pressure build-up in the auxiliary chamber 14h. Thus, the fires in the auxiliary combustion chamber 14h are directed or run through both torch apertures 15h and 16h into the main combustion chamber 1 forming torch jets which ignite the lean mixture in the main combustion chamber 1 and burn the same at a high speed.

During the low load or low speed engine operation under which the initial ignition is effected mainly with the first spark plug 18, the combustion flame or fire propagates in the auxiliary combustion chamber 14h from the outer part to the inner part thereof while the torch jets continue to run, so that the torch jets expel only a small amount of unburnt air-fuel mixture from the auxiliary combustion chamber 14h into the main combustion chamber 1; thus the energy of the fire is progressively significantly increased in the auxiliary chamber 14h. Consequently, during the low load or low speed engine operation, particularly strong torch jets can be produced, and efficient combustion can be caused even when the residual gases are retained in the auxiliary combustion chamber 14h in relatively large amount. It will be appreciated that, because of the provision of the two spark plugs, relatively strong torch jets can be produced during all engine operations including the low load or low speed operation and the high load or high speed operation.

Figure 10:
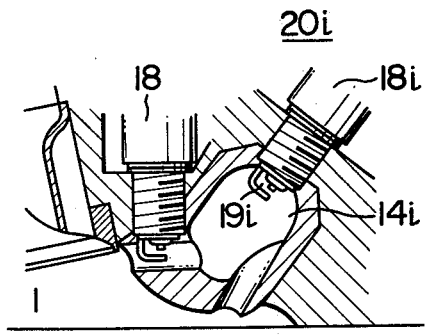

FIG. 10 illustrates an internal combustion engine of a ninth embodiment of the invention generally designated by reference numeral 20i, in which a first spark plug 18 and a second spark plug 18i are provided. The ninth embodiment is substantially similar to the sixth embodiment described hereinbefore with reference to FIG. 7, except than the ninth embodiment is provided with the second spark plug 18a having a set of electrodes 19i disposed at the inner part of auxiliary combustion chamber 14i remote from a main combustion chamber 1. Because of the provision of the first and the second spark plugs 18 and 18i, the meritorious effects substantially similar to those explained above with reference to FIG. 9 can be obtained.

Figure 11:
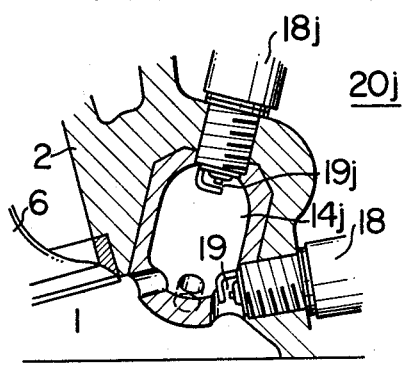

FIG. 11 illustrates an internal combustion engine of a tenth embodiment of the invention generally designated by reference numeral 20j, in which a first spark plug 18 and a second spark plug 18j are provided. The tenth embodiment is substantially similar to the seventh embodiment hereinabove described with reference to FIG. 8, except that the tenth embodiment is provided with the second spark plug 18j having a set of electrodes 19j disposed at the inner part of the auxiliary combustion chamber 14j remote from a main combustion chamber 1. The first spark plug 18 corresponds to the spark plug of the seventh embodiment. Because of the provision of the first and the second spark plugs 18 and 18j, the meritorious effects substantialoy similar to those described with reference to FIG. 9 can be obtained.

It will be understood from the eighth to tenth embodiments that the idea of providing two spark plugs is applicable to an internal combustion engine of the type which supplies a rich air-fuel mixture into an auxiliary combustion chamber through a rich mixture passage of an intake port, as well as to an internal combustion engine of the type in which a fuel injection nozzle is disposed in the intake port.

In the case where two spark plugs are provided as in the embodiments of FIGS. 9 to 11, these spark plugs may be controlled to operate in a various manner. For example, it is possible to control such that the first spark plug having the electrodes disposed in one of the torch apertures ignites the mixture therein during only the low load or low speed engine operation, while the second spark plug having the electrodes disposed at the inner part of the auxiliary combustion chamber ignites the mixture therein during only the other engine operation is including the high load or high speed operation. It is also possible to control such that the second spark plug is effective to ignite the mixture during only the high load or high speed operation, while the first spark plug is effective to ignite the mixture during only the other engine operations. Further, the ignition may be controlled such that the first spark plug is effective to ignite the mixture during all of the engine operations, while the second spark plug is effective to ignite the mixture during only the high load or high speed operation. Also it is possible to effect ignition with the second spark plug during all engine operations as well as to effect ignition with the first spark plug during only the low load or low speed operation. Furthermore, it is possible to control such that both of the first and the second spark plug ignite the mixture under all operational conditions of the engine including the high load or high speed operation and the low load or low speed operation.

Figure 12A:
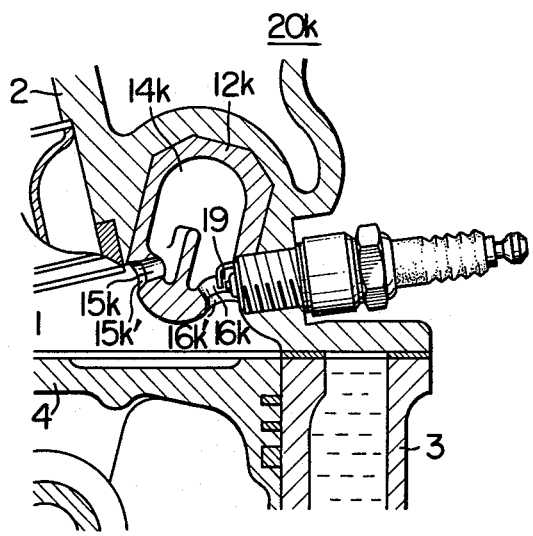
FIG. 12a is a sectional view illustrating an essential part of an eleventh embodiment of the invention, in which torch apertures have enlarged ends open to a main combustion chamber.

FIG. 12a illustrates an internal combustion engine of an eleventh embodiment of the invention generally designated by reference numeral 20k. The eleventh embodiment is substantially similar to the first embodiment previously described with reference to FIG. 1, except for the shapes or contrours of first and second torch apertures. In the eleventh embodiment, a first and a second torch apertures 15k and 16k are enlarged in a trumpet shapes at their respective ends 15k' and 16k' open to a main combustion chamber 1. Thus, the end 15k' of the first torch aperture 15k has a larger inner diameter than the end thereof open to an auxiliary combustion chamber 14k. Similarly, the end 16k' of the second torch aperture 16k is larger in inner diameter than the end thereof open to the auxiliary combustion chamber 14k.

On an intake stroke, the mixture flows through the first torch aperture 15k into the auxiliary combustion chamber 14k with a smaller flow resistance because of the provision of the trumpet-shaped enlarged end 15k' to the first torch aperture 15k. Thus, the mixture is introduced into the auxiliary combustion chamber in larger amount and at a high speed to thereby efficiently sweep away and discharge from the latter chamber the residual combustion gases retained therein. Consequently, the auxiliary combustion chamber 14k is scavenged very efficiently. Further, on a succeeding compression stroke, a part of the lean mixture in the main combustion chamber 1 flows through the torch apertures 15k and 16k into the auxiliary combustion chamber 14k in larger amount and at a high speed, also because of the provision of the trumpet-shaped enlarged ends 15k' and 16k'. The lean mixture flowing at high speed through the second torch aperture 16k efficiently sweep away from the spark plug electrodes 19 disposed therein the residual gases. The lean mixture introduced into the auxiliary combustion chamber is directed to the inner end thereof while being mixed with the rich mixture in the auxiliary combustion chamber and the residual gases still remained therein in samll amount. Thus, readily ignitable fresh mixture can be distributed around the spark plug electrodes 19 for a succeeding compression stroke.

According to the experiments conducted by the inventors, the most desirable result could be obtained under the following condition:

$$A_1/A_2 = 1.05 \text{ to } 4.0$$

In the above formula, $A_1$ designates the opening area of the enlarged ends 15k' and 16k' of the torch apertures open to the main combustion chamber, and $A_2$ designates the opening area of the ends of the torch apertures open to the auxiliary combustion chamber.

Figure 12B:
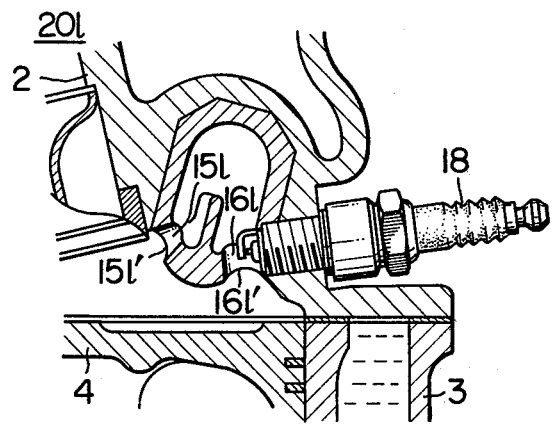
FIG. 12b is a sectional view similar to FIG. 12a illustrating a modification of the eleventh embodiment.

FIG. 12b illustrates a modification of the eleventh embodiment of FIG. 12a. In this modification, a first and a second torch apertures 15l and 16l have inner diameters gradually proportionally increased over the lengths toward a main combustion chamber 1 to provide enlarged ends 15l' and 16l', respectively, open to the main combustion chamber. This modification can provide similar result to that of the eleventh embodiment illustrated in FIG. 12a.

Figure 12C:
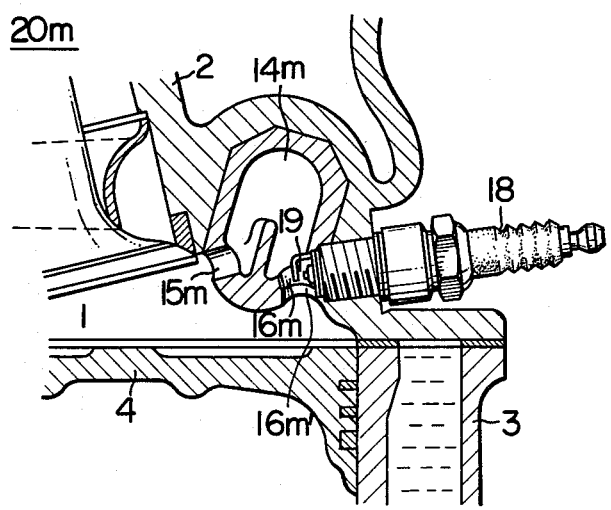
FIG. 12c is a sectional view similar to FIG. 12a illustrating another modification of the eleventh embodiment.

FIG. 12c illustrates another modification of the eleventh embodiment described with reference to FIG. 12a. In this modification, a first torch aperture 15m has an axially uniform inner diameter, while a second torch aperture 16m, in which electrodes 19 of a spark plug 18 are disposed, has a trumpet-shaped enlarged end 16m' open to a main combustion chamber 1. With the construction of this modification, the mixture flowing through the second torch aperture 16m into an auxiliary combustion chamber 14m during a compression stroke is larger in amount and higher in speed than the mixture flowing through the first torch aperture 15m thereinto. Thus, the residual combustion gases retained around the spark plug electrodes 19 can be swept away very efficienyly.

Figure 13:
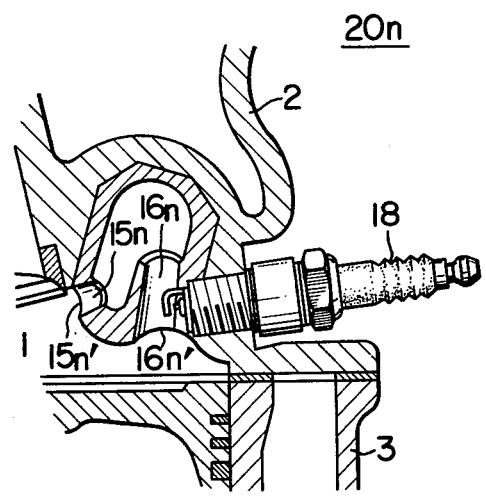
FIGS. 13 and 14 are sectional views illustrating essential parts of a twelfth and a thirteenth embodiments, respectively, of the invention, in which at least one torch aperture has an enlarged end open to a main combustion chamber.

FIG. 13 illustrates an internal combustion engine of a twelfth embodiment of the invention generally designated by reference numeral 20n. The twelfth embodiment is substantially similar to the second embodiment described hereinbefore with reference to FIG. 3, except that a first torch aperture 15n and a second torch aperture 16n of the twelfth embodiment have inner diameters gradually increased over the lengths toward a main combustion chamber 1 to form enlarged ends 15n' and 16n', respectively, open to the latter chamber. Because of the provision of the torch apertures having the shapes described, the meritorious effects similar to those described with reference to FIG. 12a can be obtained.

Figure 14:
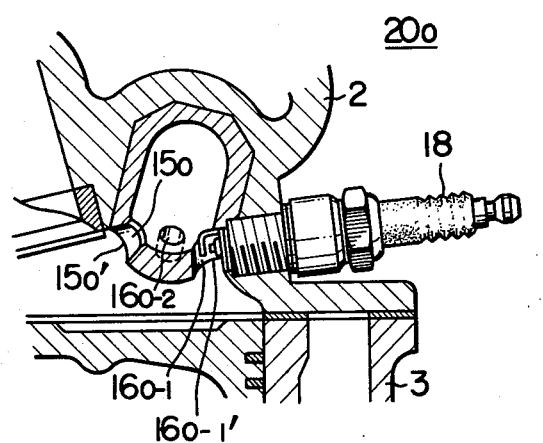

FIG. 14 illustrates an internal combustion engine of a thirteenth embodiment of the invention generally designated by reference numeral 20o. thirteenth embodiment is substantially similar to the seventh embodiment described with reference to FIG. 8, except for the shapes or contours of first and second torch apertures. In the thirteenth embodiment, a first torch aperture 15o and a second torch aperture 16o-1 have inner diameters gradually increased over the lengths toward a main combustion chamber 1 to form enlarged ends 15o' and 16o-1', respectively, open to the latter chamber, while a third torch aperture 16o-2 has an axially uniform inner diameter. Because of the provision of the torch apertures having the shapes described, the meritorious effects similar to those described with reference to FIG. 12a can be obtained.

It is to be noted that the idea of providing to at least one torch aperture the enlarged end open to the main combustion chamber as described with reference to FIGS. 12a to 14 is applicable to also an internal combustion engine of the type which includes a spark plug positioned such that the electrodes thereof are disposed in a first torch aperture. For example, the torch aperture or torch apertures of each of the fourth, fifth and sixth embodiments illustrated in FIGS. 5, 6 and 7, respectively, may be modified to have an enlarged end or enlarged ends open to the main combustion chamber.

What is claimed is:

1. An internal combustion engine comprising:
a cylinder;
a piston slidably disposed within said cylinder;
a cylinder head;

a main combustion chamber defined between said cylinder head and the top surface of said piston;

an intake port through which an air-fuel mixture flows into said main combustion chamber;

an intake valve for adjusting the mixture flowing into said main combustion chamber through said intake port;

an auxiliary combustion chamber defined in said cylinder head;

a plurality of torch apertures interconnecting said main and auxiliary combustion chambers;

said auxiliary combustion chamber being, before a combustion stroke of said engine, supplied through one of said torch apertures with an amount of the air-fuel mixture for pre-combustion therein, said auxiliary chamber being scavenged during an intake stroke of a succeeding cycle of the engine in such a way that the air-fuel mixture is introduced into said auxiliary chamber through said one of said torch apertures, guided into a deep area of said auxiliary chamber and directed to another of said torch apertures, pushing out a residual gas in said deep area through said another of said torch apertures into the main chamber so that substantially no residual gas remains behind said another of said torch apertures which is located at the end of a path from said one to said another of said torch apertures; and a spark plug for causing the pre-combustion of the mixture in said auxiliary combustion chamber to thereby generate torch jets which are directed through said torch apertures into said main combustion chamber to ignite the mixture therein, said spark plug igniting the mixture around said electrodes in said another of said torch apertures propagating a combustion flame into both the deep area of said auxiliary chamber and said main chamber, said flame igniting the air-fuel mixture in said deep area to spurt a combustion flame as torch jets through all of said torch apertures.

2. An internal combustion engine as defined in claim 1, wherein said spark plug electrodes are disposed in that torch aperture which receives from said intake port said mixture during the intake stroke.

3. An internal combustion engine as defined in claim 1, wherein said auxiliary combustion chamber is defined by a substantially smoothly continuous surface in which said torch apertures are open, and at least one of said torch apertures has an axis substantially tangential to said smooth continuous surface.

4. An internal combustion engine as defined in claim 1, further comprising guide wall means extending from a position between said torch apertures toward said deep area of said auxiliary combustion chamber remote from said main combustion chamber so that the ends of said torch apertures open to said auxiliary combustion chamber may be internally communicated with each other through said deep area of said auxiliary combustion chamber.

5. An internal combustion engine as defined in claim 4, wherein said guide wall means includes a bank which at least partially surrounds the torch aperture receiving therein said spark plug electrodes so that the last-mentioned torch aperture may extend into said auxiliary combustion chamber and be open thereto at the inner part thereof remote from said main combustion chamber.

6. An internal combustion engine as defined in claim 1, wherein said torch apertures open to said main combustion chamber are so positioned and directed as to supply therethrough part of said mixture in said main chamber into said auxiliary combustion chamber during a compression stroke of said engine.

7. An internal combustion engine as defined in claim 1, wherein the number of said torch aperture is two.

8. An internal combustion engine as defined in claim 1, wherein the number of said torch apertures is three.

9. An internal combustion engine as defined in claim 1, further comprising means dividing said intake port into two passages for lean and rich air-fuel mixtures, respectively, said rich mixture passage having its downstream end positioned adjacent to said least one of said torch apertures, whereby, during the intake stroke of said engine, said auxiliary combustion chamber is supplied with a charge of a mixture which is richer than the mixture supplied into said main combustion chamber.

10. An internal combustion engine as defined in claim 1, wherein the inner peripheral surface of said auxiliary combustion chamber and said torch apertures are arranged such that the mixture introduced through at least one of said torch apertures into said auxiliary combustion chamber during the intake stroke flows therein forming a loop.

11. An internal combustion engine as defined in claim 6, wherein the inner peripheral surface of said auxiliary combustion chamber and said torch apertures are arranged such that the mixture introduced through said torch apertures into said auxiliary combustion chamber during the compression stroke forms a vortex flow therein.

12. An internal combustion engine as defined in claim 1, wherein at least one of said torch apertures has an enlarged open end facing said main combustion chamber.

13. An internal combustion engine as defined in claim 12, wherein said at least one of said torch apertures having said enlarged open end is so positioned and directed as to receive from said intake port the mixture during the intake stroke of said engine.

14. An internal combustion engine as defined in claim 13, wherein said at least one torch aperture having said enlarged end consists of an aperture having its inner diameter gradually increased over the length toward said main combustion chamber.

15. An internal combustion engine as defined in claim 7, wherein one of said torch apertures has an enlarged open end facing said main combustion chamber.

16. An internal combustion engine as defined in claim 8, wherein the end of at least one of said torch apertures open to said main combustion chamber is enlarged.

17. An internal combustion engine as defined in claim 12, wherein said enlarged open end is trumpet-shaped.

18. An internal combustion engine comprising:
a cylinder;
a piston slidably disposed within said cylinder;
a cylinder head;
a main combustion chamber defined between said cylinder head and the top surface of said piston;
an intake port through which an air-fuel mixture flows into said main combustion chamber;
an intake valve disposed in said cylinder head for controlling the mixture flowing through said intake port into said main combustion chamber;
an auxiliary combustion chamber defined in said cylinder head;

a first and a second torch apertures defined in a wall of said auxiliary chamber for communicating said auxiliary chamber with said main chamber;

said first and second torch apertures being arranged such that the mixture introduced into said main combustion chamber during an intake stroke of said engine is, during the same stroke, partly introduced through said first torch aperture into said auxiliary combustion chamber to thereby urge the residual gases remaining in said auxiliary combustion chamber to be forced out therefrom through said second torch aperture; and a spark plug having a set of electrodes disposed in one of said torch apertures for causing a pre-combustion of the mixture in said auxiliary combustion chamber thereby to produce a pre-combustion flame which always spurts out through both of said first and second torch apertures.

* * * * *